May 19, 1953     A. M. STONE     2,639,377
PULSE ANALYZER
Filed April 30, 1946
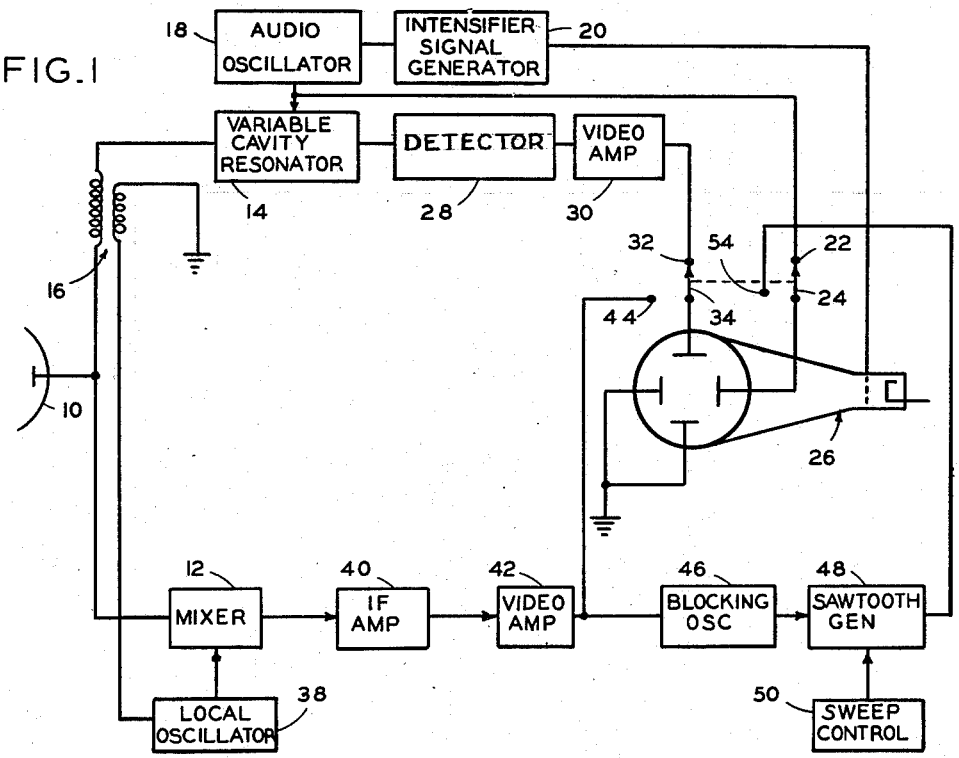
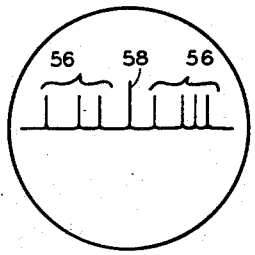
FIG. 2
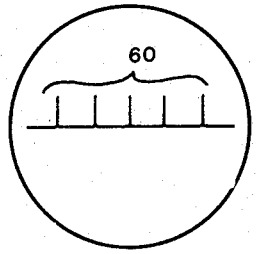
FIG. 3
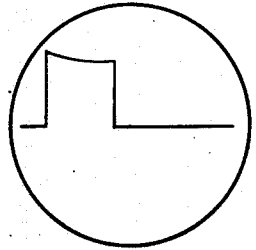
FIG. 4
INVENTOR
ALBERT M. STONE
BY
*William D. Hall*
ATTORNEY Patented May 19, 1953

2,639,377

UNITED STATES PATENT OFFICE 2,639,377

PULSE ANALYZER

Albert M. Stone, Newton, Mass., assignor, by mesne assignments, to United States of America as represented by the Secretary of War Application April 30, 1946, Serial No. 665,996

3 Claims. (Cl. 250—20)

1

This invention relates to electrical apparatus and more particularly to apparatus for analyzing signals that may lie within a selected band of radio frequencies.

It is desirable at times to determine what transmission if any exists within a selected band of radio frequencies. The information desired usually consists of the frequencies on which various stations within the selected band are operating and in case of pulse type transmission, the pulse repetition rate of the received signals and the pulse width and pulse shape of these signals.

It is an object of the present invention, therefore, to provide a novel measuring device that will provide information as to the pulse repetition frequency of pulse radio signals lying within a selected radio frequency band.

It is a further object of this invention to provide a measuring device that will provide information as to the pulse width and the pulse shape of any pulse type radio signal.

It is a still further object of this invention to provide a measuring device that will completely analyze signals transmitted within a selected radio frequency band, giving the frequency of signals within this region together with the pulse width and the pulse shape of all pulse type signals.

For a better understanding of this invention together with other and further objects thereof, reference is had to the following description to be read in connection with the accompanying drawing in which:

Fig. 1 is a schematic drawing in block form of the present invention;

Fig. 2 is a view of the indicator screen when the measuring device is used for measuring frequencies within a selected band of radio frequencies;

Fig. 3 is a view of the indicator screen when the device is used to measure pulse repetition frequency of a selected signal; and Fig. 4 is a view of the indicator screen when the device is employed to measure the pulse width and pulse shape of a selected signal.

In Fig. 1, upper and lower channels in the apparatus are shown. An antenna 10 is connected to a mixer 12 in the lower channel and also to a variable cavity resonator 14 in the upper channel. The connection from antenna 10 to resonator 14 is made through a transmission line having provision for coupling energy thereto, such provision being diagrammatically shown as transformer 16. The resonant frequency of cavity resonator 14 is varied over a predetermined frequency band at

2 a rate determined by an audio oscillator 18. One suggested manner of so varying the cavity resonant frequency is to provide a capacitance region within the cavity whose capacitance can be varied by means of a rod passing into the region through a suitable opening in the cavity, the rod being actuated by an electromagnetic device such as a loudspeaker voice coil. The output of audio oscillator 18 is applied to an intensifier signal generator 20 and also to a contact point 22 of a two position switch 24. The common point of switch 24 is connected to one of the horizontally deflecting plates in a cathode ray oscilloscope tube 26. The output of intensifier signal generator 20 is applied to the intensity grid of tube 26.

The output of resonator 14 is applied to detector 28, which detects the radio frequency signals received by antenna 10 and applies them as video signals to a video amplifier 30.

The output of amplifier 30 is connected to a contact point 32 of a second two position switch 34 which is ganged to switch 24. The common terminal of switch 34 is connected to one of the vertically deflecting plates of oscilloscope tube 26 and the remaining deflecting plates of tube 26 are connected to a point of fixed reference potential, here designated by a ground symbol. The connection to the remaining elements of tube 26 are made in a conventional manner and these latter connections are therefore not shown in the drawing.

Signals supplied by a local oscillator 38 to a mixer 12 beat with signals supplied thereto by antenna 10 to provide an intermediate frequency signal of some convenient frequency; for example, 30 megacycles per second. The output of oscillator 38 is also connected to the device indicated diagrammatically as transformer 16. The output of mixer 12 is supplied through an intermediate frequency amplifier 40 to a video amplifier 42, and the output of amplifier 42 is in turn connected to the remaining contact point 44 of switch 34. The output of amplifier 42 is also connected to a blocking oscillator 46. Oscillator 46, whenever a video signal is received from amplifier 42, produces a sharp trigger pulse which acts as an initiating signal to a sawtooth generator 48. The sweep speed of sawtooth generator 48 is controlled by a sweep control circuit 50. The output signal from generator 48 is applied to the remaining contact point 54 of switch 24.

The operation of the electrical apparatus here disclosed is as follows:

Signals in a wide band of frequencies are received by antenna 10. This frequency band may include all frequencies to which resonator 14 may be tuned. In practice, it has been easy to cover a 20 per cent frequency band at ultra high frequencies. All signals within the selected band are applied to cavity resonator 14, but only the signals near the instantaneous resonant frequency of resonator 14 are passed on to converter 28. The resonant frequency of resonator 14 is cyclically swept over the selected band of radio frequencies at a rate determined by audio oscillator 18. The beam of the cathode ray tube 26 is swept horizontally at a corresponding rate by the output of oscillator 18. The radio frequency signals passed by resonator 14 are detected or changed to video signals by converter 28 and amplified by amplifier 30. Assuming that switches 24 and 34 are in the positions shown, the video signals are applied through switch 34 to the vertically deflecting plates of tube 26. The video signals from amplifier 30 cause pips or pulses to appear on the base line of tube 26 at positions corresponding to the frequencies of signals received by antenna 10.

Fig. 2 illustrates the appearance of the screen when the upper channel of the disclosed apparatus is being used. Pips 56 on the screen shown in Fig. 2 represent separate signals received by antenna 10. The position of any one of these pips 56 along the base line is an indication of the frequency of a corresponding signal. A suitable frequency scale (not shown) may, if desired, be superimposed on the indication shown in Fig. 2 to measure exactly the frequency of any signal appearing thereon. The output of local oscillator 38 is loosely coupled to the input of cavity resonator 14 through transformer 16, so that a pip 58 appears on the screen of tube 26 at a frequency corresponding to the frequency to which oscillator 38 is tuned.

To analyze a particular signal appearing on the screen of the indicator, local oscillator 38 may be tuned so that pip 58 substantially coincides in position with one of the pips 56. When this coincidence has been achieved, switches 34 and 24 may be thrown to the position in which contacts with points 44 and 54 are established. Radio frequency signals from antenna 10 are applied to mixer 12 where they are combined with the signal from local oscillator 38. The tuning of local oscillator 38 may have to be adjusted slightly because it may be tuned to a frequency that differs from that of the selected signal plus or minus the intermediate frequency. This frequency deviation is very small compared to the tuning range of oscillator 38 and is also small compared to the spacing in frequency of signals 56. The signal selected by the tuning of local oscillator 38 and the pass characteristic of intermediate frequency amplifier 40 is applied to video amplifier 42. The output video signals from amplifier 42 are applied to the vertically deflecting plates of oscilloscope 26. These video signals are also applied to the blocking oscillator 46 and cause this latter circuit to produce a series of sharp voltage pulses. Sweep control circuit 50 is set so that the sweep voltage generated by sawtooth generator 48 has a period equal to several times the pulse repetition period of the incoming signals. The sweep of the cathode ray beam of tube 26 will start at the time of one incoming signal and continue substantially linearly for the time duration of the signal from generator 48. At the end of this time the sweep will be returned to its initial point and again start at the time of another incoming signal.

The screen of the tube 26 in this instance appears as shown in Fig. 3. A series of evenly spaced pips or pulses 60 appear on the base line, and the space between any two of these pulses is equal to the pulse repetition period of the selected signals. This time interval may be measured by means of a suitable scale superimposed on the indication shown in Fig. 3.

To analyze the pulse width and pulse shape of one of the pulses appearing in Fig. 3, sweep control unit 50 is adjusted so that a fast sweep is produced by generator 48; that is, generator 48 completes a cycle during each period between successive received pulses. Each sharp voltage pulse from blocking oscillator 46 now causes a corresponding sweep to appear on the screen of tube 26, and the video signals applied from amplifier 42 to the vertically deflecting plates of tube 26 cause an indication to appear on the screen of this tube that is similar to the indication shown in Fig. 4. The indication of Fig. 4 is the voltage-time envelope of the incoming pulse signal. The amplitude and the time duration of this pulse, as well as the voltage-time shape, may be easily analyzed by viewing the screen of tube 26.

In some embodiments of this invention it may be desirable, when the fast sweep is used to cause the video signals from amplifier 42 to be delayed slightly before being applied to the vertically deflecting plates, so that the pulse will appear at the center of the base line rather than near the beginning of the base line as herein shown. This is for convenience only, and any necessary changes in the circuit will be obvious to those skilled in the art.

Reviewing briefly the operation of this circuit, when switches 34 and 24 make contact with points 32 and 22 respectively, the apparatus acts as a search receiver and supplies visual signals that indicate on the screen of a cathode ray tube the frequencies of all transmitters operating within the selected band of radio frequencies swept by this device. By securing time-coincidence between the signal from local oscillator 38 and any incoming signal displayed on the screen of tube 26, and by throwing switches 34 and 24 so that they make contact with points 44 and 54, respectively, the pulse repetition frequency and pulse shape of the selected incoming signals may be studied. To measure the pulse repetition frequency of the incoming signals, sweep control 50 is set to provide a slow sweep on tube 26. To analyze the pulse amplitude pulse width, and pulse shape, switch control 50 is set to provide a fast sweep on tube 26.

Thus, among other advantages, signals within a selected radio frequency band may be completely analyzed by means of the apparatus herein disclosed having only three controls.

While there has been described what is at present considered to be the preferred embodiment of this invention, it will be obvious to those skilled in the art that various changes and modifications may be made therein without departing from the scope of the invention as set forth in the appended claims.

The invention claimed is:

1. An electrical analyzing apparatus for determining the characteristics of input radio signals, comprising a cathode ray tube indicator, an energy transfer device having primary and secondary elements, a band-pass filter means, means for cyclically varying the center frequency of said filter means, means for applying said input radio signals to said filter means through the secondary of said transfer device, detector means associated with said filter means for amplifying and detecting signals passing therethrough, first amplifier means for amplifying signals from said detector means, first switching means for connecting the output of said first amplifier to the vertically deflecting plates of said cathode ray tube in a first position thereof, second switching means for applying a sweep voltage synchronized with the variation of said center frequency to the horizontally deflecting plates of said cathode ray tube in a first position thereof, a mixer, a local oscillator, means for connecting the local oscillator to the primary of said transfer device, means for applying said input radio signals and signals from said local oscillator to said mixer, second amplifier means for detecting and amplifying signals from said mixer, said first switching means connecting the output of said second amplifier to the vertically deflecting plates of said cathode ray tube in a second position thereof, a sweep generator, sweep control means for altering the characteristic of the signal from said sweep generator, means responsive to the output of said second amplifier means for controlling the operation of said sweep generator means, and said second switching means applying the output of said sweep generator to the horizontally deflecting plates of said cathode ray tube in a second position thereof.

2. A signal analyzing apparatus for determining the characteristics of input radio signals lying within a selected band of radio frequencies, comprising: a first signal channel including filter means for selecting and passing a narrow band of said radio signals and means for cyclically varying the center-frequency of the pass band of said filter; first sweep means coupled to said first signal channel for producing a first sweep voltage synchronized with the variation in said center-frequency; a second signal channel including superheterodyne means having a tunable local oscillator; second sweep means coupled to said second signal channel for producing a second sweep voltage in response to the output of said second signal channel, said second sweep means having means therein for adjusting the duration of said second sweep voltage; means for introducing a signal from said local oscillator into the input of said first signal channel; cathode ray tube indicator means including first deflecting means for deflecting the cathode ray of said tube along a first rectangular coordinate in response to a signal applied thereto and second deflecting means for deflecting said cathode ray along a second rectangular coordinate in response to a signal applied thereto; means for selectively applying the output of a respective one of said first and second signal channels to said first deflecting means; and means for selectively applying a respective one of said first and second sweep voltages to said second deflecting means.

3. A signal analyzing apparatus for determining the characteristics of input radio signals, comprising a cathode ray tube indicator, a first channel having said radio signals applied to the input thereof for producing upon said indicator a spectrum representation of said input radio signals, a second channel fed by said radio signals including a tunable local oscillator for selecting a single one of said radio signals and separately producing upon said indicator a representation of said single signal, means in said second channel to provide a time base upon said indicator, means for determining the repetition rate and wave shape of said signals, comprising means for varying the time interval represented by said time base, means for applying the output of said local oscillator to the input of said first channel, and means for delineating the signals from either said first or second channels upon said indicator.

ALBERT M. STONE.

References Cited in the file of this patent

UNITED STATES PATENTS

| Number | Name | Date |
|---|---|---|
| 2,355,363 | Christaldi | Aug. 8, 1944 |
| 2,381,940 | Wallace et al. | Aug. 14, 1945 |
| 2,387,685 | Sanders | Oct. 23, 1945 |
| 2,407,898 | Norgaard | Sept. 17, 1946 |
| 2,414,096 | Dimond | Jan. 14, 1947 |
| 2,416,346 | Potter | Feb. 25, 1947 |
| 2,419,205 | Feldman | Apr. 22, 1947 |
| 2,450,018 | Preisman | Sept. 28, 1948 |
| 2,454,782 | De Rosa | Nov. 30, 1948 |
| 2,483,802 | Bradley | Oct. 4, 1949 |
| 2,484,618 | Fisher | Oct. 11, 1949 |
| 2,498,919 | Heller | Feb. 28, 1950 |
| 2,520,138 | Frink | Aug. 29, 1950 |